(12) United States Patent
Kim et al.

(10) Patent No.: US 8,073,496 B2
(45) Date of Patent: Dec. 6, 2011

(54) HELMET TYPE HANDS FREE SYSTEM WITH RADIO COMMUNICATION FUNCTION

(75) Inventors: Young Ho Kim, Seoul (KR); Joon Ho Kim, Yongin-si (KR); Jae Ho Kang, Yongin-si (KR)

(73) Assignee: Dream Technology Co., Seongnam-si (KR)

( * ) Notice: Subject to any disclaimer, the term of this patent is extended or adjusted under 35 U.S.C. 154(b) by 498 days.

(21) Appl. No.: 12/358,106

(22) Filed: Jan. 22, 2009

(65) Prior Publication Data

US 2009/0186665 A1 Jul. 23, 2009

(30) Foreign Application Priority Data

Jan. 23, 2008 (KR) .................. 10-2008-0007109

(51) Int. Cl.
*H04M 1/00* (2006.01)
*H04B 5/00* (2006.01)
*H04B 7/00* (2006.01)
*H04M 3/00* (2006.01)

(52) U.S. Cl. .............. 455/569.2; 455/569.1; 455/41.1; 455/41.2; 455/41.3; 455/420; 455/556.1; 455/556.2; 455/575.1; 455/575.9

(58) Field of Classification Search ........ 455/41.1–41.3, 455/420, 556.1–556.2, 569.1–569.2, 575.1, 455/575.9
See application file for complete search history.

(56) References Cited

U.S. PATENT DOCUMENTS

2008/0220718 A1* 9/2008 Sakamoto et al. ........... 455/41.2

FOREIGN PATENT DOCUMENTS

| KR | 20-0325765 Y1 | 9/2003 |
| KR | 20-0407382 Y1 | 1/2006 |

* cited by examiner

*Primary Examiner* — Nick Corsaro
*Assistant Examiner* — Munsoon Choo
(74) *Attorney, Agent, or Firm* — Knobbe Martens Olson & Bear LLP

(57) ABSTRACT

A helmet-type hands free system with a radio communication function is provided, in which a hands free function key input unit for executing a hands free function is mounted on a handle of a vehicle. Accordingly, it is possible to operate a hands free module without taking a hand off the handle and to establish radio communication between neighboring hands free modules without communicating with a base station. As a result, safer driving is possible and radio communication costs are reduced.

5 Claims, 3 Drawing Sheets

US 8,073,496 B2

HELMET TYPE HANDS FREE SYSTEM WITH RADIO COMMUNICATION FUNCTION

CROSS-REFERENCE TO RELATED APPLICATION

The present application claims priority to Korean Patent Application No. 10-2008-7109 filed on Jan. 23, 2008, the entire disclosure of which is incorporated herein by reference.

BACKGROUND OF THE INVENTION

1. Field of the Invention

The present invention relates to a helmet-type hands free system with a radio communication function. More particularly, the present invention relates to a helmet-type hands free system with a radio communication function which enables operation of a hands free module via an operating switch mounted on a handle of a vehicle and enables radio communication between hands free modules without intervention of a base station.

2. Description of the Related Art

The popularization of mobile communication terminals and the development of mobile communication technologies facilitate radio communication throughout the whole country. Such a mobile communication system allows users to perform radio communication anytime, anywhere. However, drivers are not allowed to make phone calls during driving due to traffic regulations for safe driving. Accordingly, drivers need to purchase hands-free devices to make phone calls during driving.

Meanwhile, motorcyclists, bicyclists or in-line skaters should wear safety helmets. For example, a bicyclist wearing a safety helmet has to stop and take the helmet off to use a mobile communication terminal.

The bicyclist may use a hands-free device consisting of an earphone and a microphone which is connected to the mobile communication terminal. However, the bicyclist has to take off the helmet to put the earphone in his/her ear. Furthermore, the earphone cable may cause a disturbance to the bicyclist's motion.

Besides, when a phone call is received, the bicyclist has to push buttons on the mobile communication terminal or the hands-free device to answer the phone, causing a danger to the bicyclist.

To address the above-mentioned problems, Korean Utility Model No. 325,765, registered on Aug. 27, 2003, entitled "Mobile communication terminal incorporating helmet using Bluetooth," is proposed. However, this invention requires an additional mobile communication terminal using the Bluetooth protocol. Furthermore, motorcyclists, bicyclists or in-line skaters wearing helmets typically wear gloves for protection or thermal insulation, which makes operating buttons difficult.

To address this problem, Korean Utility Model No. 407, 382, registered on Jan. 23, 2006, entitled "Hands-free helmet for radio communication with mobile communication terminal," is proposed.

However, this invention can also cause a danger to a motorcyclist or a bicyclist since he or she has to take his or her hand off a handle and push buttons attached on his or her helmet to make a phone call.

Meanwhile, since motorcyclists or bicyclists riding in a line have difficulty in conversation due to noise or distance, they often place a phone call to each other, incurring high phone charges.

SUMMARY OF THE INVENTION

The present invention is conceived to solve the problems of the conventional techniques as described above, and it is an aspect of the present invention to provide a helmet-type hands free system with a radio communication function in which an operating switch for the helmet-type hands free system is mounted on a handle of a vehicle so that the hands free system can be operated without taking a hand off the handle and radio communication can be established between neighboring hands free modules without communicating with a base station.

In accordance with an aspect of the present invention, a helmet-type hands free system with a radio communication function includes: a helmet worn by a driver to protect a head from impact; a hands free module built into the helmet to perform a hands free function of a mobile communication terminal or to perform short-range radio communication with a neighboring hands free module; a first Bluetooth module connected to the mobile communication terminal to convert an output signal from the mobile communication terminal into a short-range radio signal and output the converted short-range radio signal, or to convert a short-range radio signal and output the converted signal to the mobile communication terminal; a hands free function key input unit mounted on a handle of a vehicle to selectively input the hands free function or the short-range radio communication function; a first ZigBee module connected to the hands free function key input unit to transmit an input condition of the hands free function key input unit to the hands free module; a second Bluetooth module included in the hands free module and performing wireless connection with the first Bluetooth module to perform the hands free function; a second ZigBee module included in the hands free module and performing wireless connection with the first ZigBee module to perform the short-range radio communication function; a control unit included in the hands free module to control the second Bluetooth module and the second ZigBee module according to the input condition of the hands free function key input unit; and a microphone and a speaker connected to the control unit to input and output an audio signal according to the hands free function or the short-range radio communication function.

The first ZigBee module may further include a display unit receiving and displaying information of another hands free module with a radio communication function located by the control unit through the second ZigBee module, and displaying an operation condition of the hands free function.

The hands free module may be assigned a unique ID to identify the other party upon performing the radio communication function.

The mobile communication terminal and the first Bluetooth module may be incorporated into a single entity.

The hands free function key input unit and the first ZigBee module may be incorporated into a single entity.

BRIEF DESCRIPTION OF THE DRAWINGS

The above and other features and advantages of the present invention will become apparent from the following description of exemplary embodiments given in conjunction with the accompanying drawings, in which.

DETAILED DESCRIPTION OF THE INVENTION

Figure 1:
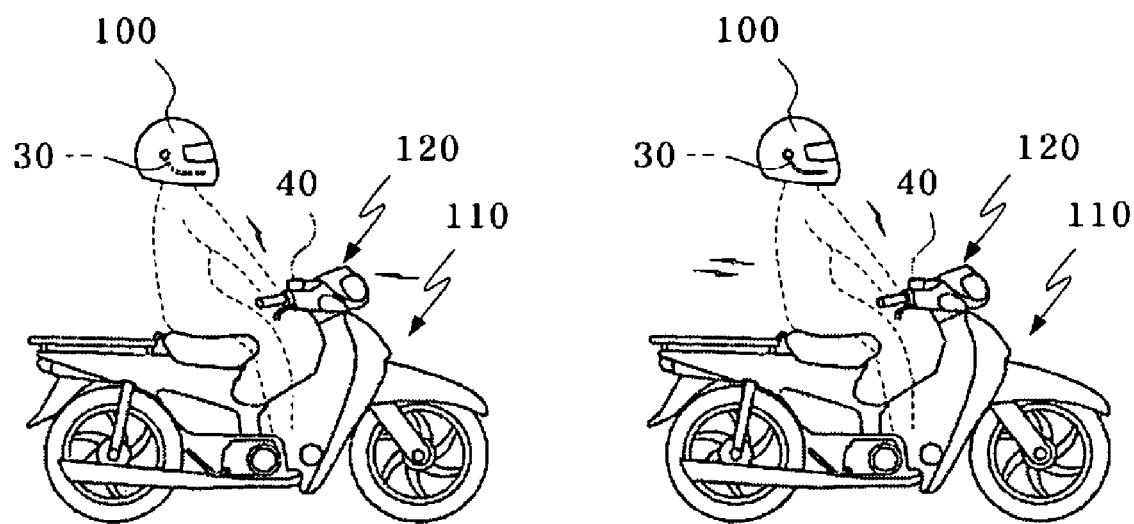
FIG. 1 illustrates the use of a helmet-type hands free system with a radio communication function according to one embodiment of the present invention.

Exemplary embodiments of the present invention will hereinafter be described in detail with reference to the accompanying drawings. Configurations of the present invention identical to those of conventional techniques will be denoted by the same reference numerals or terms. It should be noted that the embodiments of the present invention are given by way of illustration only and do not limit the scope of the present invention, and that many modifications and changes can be made by a person having ordinary knowledge in the art without departing from the scope of the invention.

FIG. 1 illustrates the use of a helmet-type hands free system with a radio communication function according to one embodiment of the present invention.

Referring to FIG. 1, a hands free module 30 is built into a helmet 100 which is an armored and protective covering for the head. The hands free module 30 is configured such that drivers driving in a line can establish radio communication therebetween.

A handle 120 of a motorcycle 110 is equipped with a hands free function key input unit 40.

The hands free function key input unit 40 controls signals transmitted and received between a driver's mobile communication terminal and the hands free module 30. The hands fee function key input unit 40 also controls signals for radio communication with hands free modules 30 of neighboring drivers.

Figure 2:
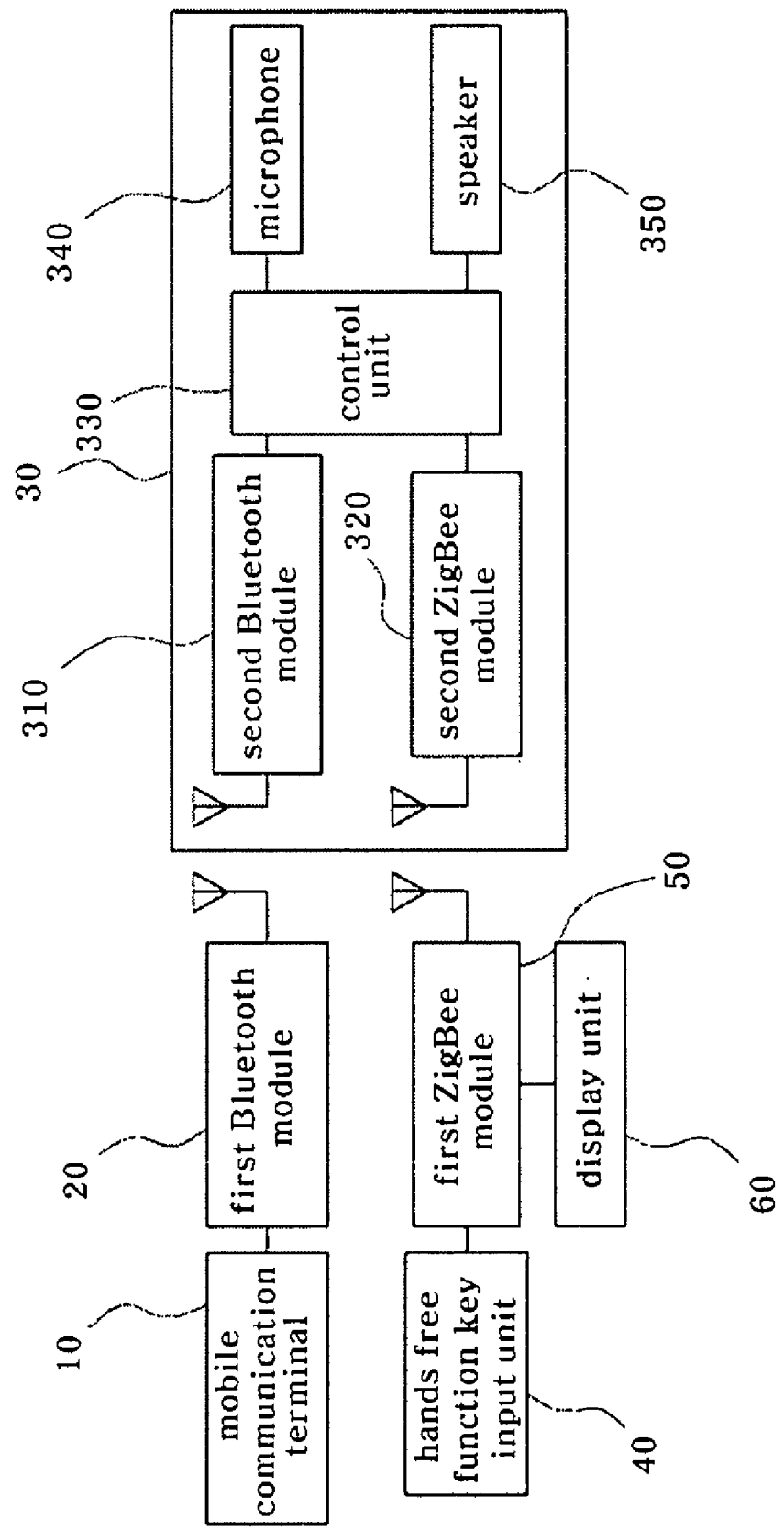
FIG. 2 is a block diagram of a helmet-type hands free system with a radio communication function according to one embodiment of the present invention.

FIG. 2 is a block diagram of a helmet-type hands free system with a radio communication function according to one embodiment of the present invention.

Referring to FIG. 2, the helmet-type hands free system includes a first Bluetooth module 20 which is connected to a mobile communication terminal 10. The first Bluetooth module 20 converts an output signal of the mobile communication terminal 10 into a short-range radio signal, or converts an input short-range radio signal and outputs it to the mobile communication terminal 10. The first Bluetooth module 20 may be built into the mobile communication terminal 10, or may be separately provided and connected to the mobile communication terminal 10.

The helmet-type hands free system includes a hands free module 30 which is built into the helmet 100. The hands free module 30 is configured to include a second Bluetooth module 310 which is wirelessly connected to the first Bluetooth module 20 to exchange information with the mobile communication terminal 10. The hands free module 30 also includes a second ZigBee module 320 which establishes radio communication with a hands free module 30 of a neighboring driver and is wirelessly connected to a hands free function key input unit 40 to exchange a control signal therewith. The hands free module 30 includes a control unit 330 which outputs a signal input to a microphone 340 to the second Bluetooth module 310 or the second ZigBee module 320, and outputs a signal received from the second Bluetooth module 310 or the second ZigBee module 320 to a speaker 350.

The helmet-type hands free system includes a hands free function key input unit 40 which is mounted on a handle 120 of a motorcycle 110 to select a hands free function of the mobile communication terminal 10 or to establish radio communication with a neighboring driver's hands free module 30. The hands free function key input unit 40 includes a first ZigBee module 50 which is wirelessly connected to the second ZigBee module 320 of the hands free module 30 to output keys input from the hands free function key input unit 40. The first ZigBee module 50 further includes a display unit 60 which receives and displays ID information of a neighboring driver's hands free module 30 that can establish radio communication with the first ZigBee module 50. The display unit 60 also displays the operation condition of hands free of the mobile communication terminal 10. The hands free function key input unit 40, the first ZigBee module 50 and the display unit 60 may be incorporated into a single entity.

Figure 3:
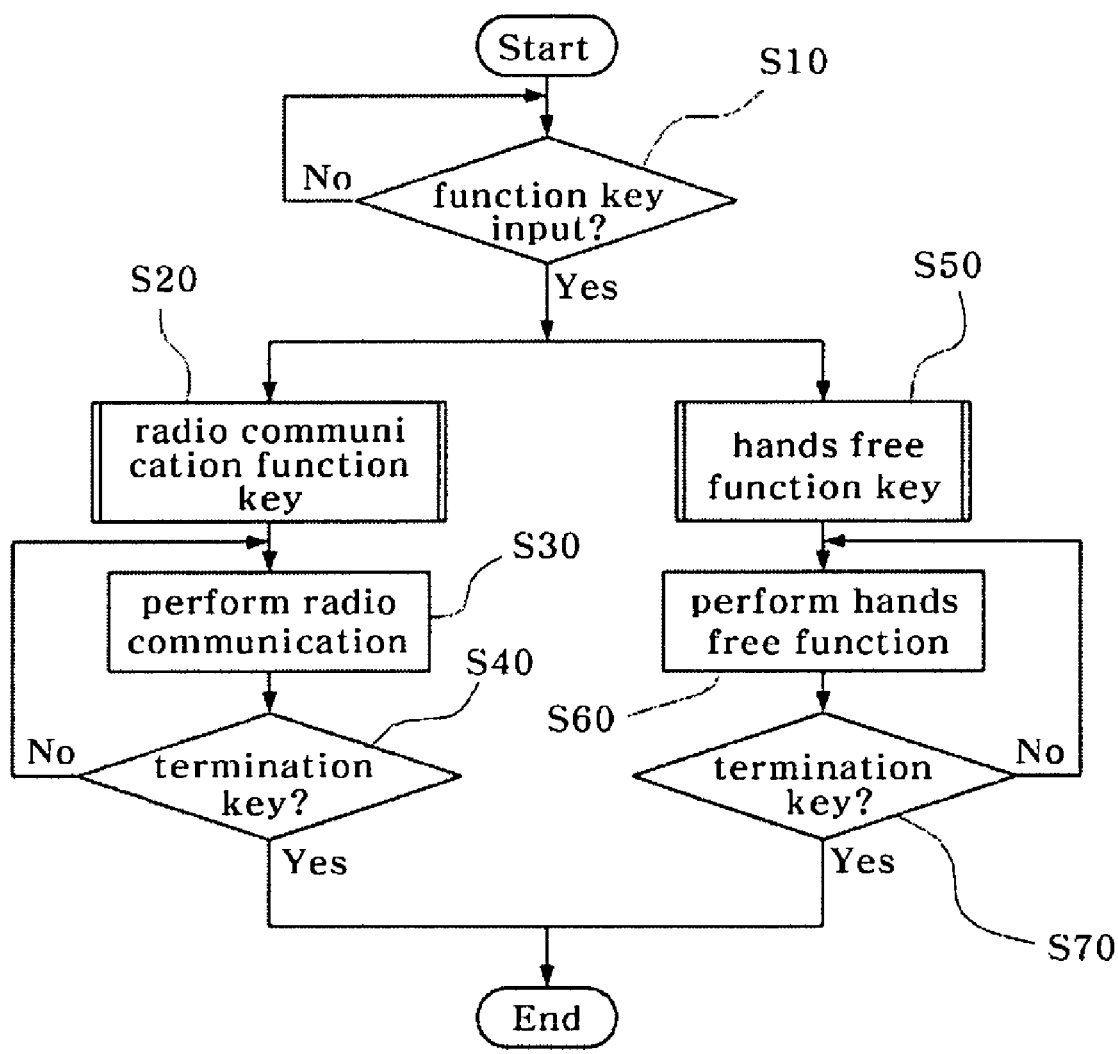
FIG. 3 is a flow chart of the operation of a helmet-type hands free system with a radio communication function according to one embodiment of the present invention.

FIG. 3 is a flow chart of the operation of a helmet-type hands free system with a radio communication function according to one embodiment of the present invention.

Referring to FIG. 3, a signal input to the hands free function key input unit 40 is output to the first ZigBee module 50. The first ZigBee module 50 transmits the signal to the second ZigBee module 320. The second ZigBee module 320 transmits the signal to the control unit 330. In operation S10, the control unit 330 determines whether a function key is input.

If a hands free function key is input in operation S50, the control unit outputs the transmitted signal to the second Bluetooth module 310 and then the second Bluetooth module 310 transmits the signal to the first Bluetooth module 20 so that the mobile communication terminal 10 can perform a hands free function in operation S60. Although not shown, the hands free function key is input, for example, by pushing a call button.

The hands free function performed in operation S60 will be described in more detail.

A first audio signal, which is transmitted to the mobile communication terminal 10, is transmitted to the second Bluetooth module 310 through the first Bluetooth module 20. The second Bluetooth module 310 outputs the first audio signal to the control unit 330. The control unit 330 outputs the first audio signal to the speaker 350. In addition, a second audio signal, which is input to the control unit 330 through the microphone 340, is output to the second Bluetooth module 310. The second Bluetooth module 310 transmits the second audio signal to the first Bluetooth module 20. The first Bluetooth module 20 transmits the second audio signal to the mobile communication terminal 10. As such, the hands free function is performed in operation S60.

The hands free function is terminated if a hands free termination key is input in operation S70.

The operation S20 in which a radio communication function key is input will be described. Although not shown, it is assumed that a call key for establishing radio communication without intervention of a base station, or a search key for searching for a user for radio communication is input as a radio communication function key. In operation S20, if a radio communication function key is input, a radio communication input signal is transmitted to the second ZigBee module 320 through the first ZigBee module 50, and the second ZigBee module 320 searches IDs of neighboring hands free modules 30. Next, the second ZigBee module 320 transmits the searched IDs to the first ZigBee module 50. The first ZigBee module 50 displays information for radio communication on the display unit 60.

In operation S30, radio communication is performed for an ID selected from among the IDs which are displayed on the display unit 60. At this time, since the radio communication is established between neighboring second ZigBee modules 320, a voice call may be placed using the hands free modules 30 without communicating with a base station.

The radio communication function is terminated if a radio communication termination key is input in operation S40.

As apparent from the above description, according to the present invention, since a switch for operating a helmet-type hands free system is mounted on a handle of a vehicle, it is possible to operate the hands free system without taking a hand off the handle. Furthermore, neighboring hands free modules can establish radio communication with each other without communicating with a base station, resulting in reduced communication costs.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A helmet-type hands free system with a radio communication function, comprising:
   a helmet worn by a driver to protect a head from an impact;
   a hands free module built into the helmet to perform a hands free function of a mobile communication terminal or to perform short-range radio communication with a neighboring hands free module;
   a first Bluetooth module connected to the mobile communication terminal to convert an output signal from the mobile communication terminal into a short-range radio signal and output the converted short-range radio signal, or to convert a short-range radio signal and output the converted signal to the mobile communication terminal;
   a hands free function key input unit mounted on a handle of a vehicle to selectively input the hands free function or the short-range radio communication function;
   a first ZigBee module connected to the hands free function key input unit to transmit an input condition of the hands free function key input unit to the hands free module;
   a second Bluetooth module included in the hands free module and performing wireless connection with the first Bluetooth module to perform the hands free function;
   a second ZigBee module included in the hands free module and performing wireless connection with the first ZigBee module to perform the short-range radio communication function;
   a control unit included in the hands free module to control the second Bluetooth module and the second ZigBee module according to the input condition of the hands free function key input unit; and
   a microphone and a speaker connected to the control unit to input and output an audio signal according to the hands free function or the short-range radio communication function.

2. The helmet-type hands free system according to claim 1, wherein the first ZigBee module further comprises a display unit receiving and displaying information of another hands free module with a radio communication function which is located by the control unit through the second ZigBee module, and displaying an operation condition of the hands free function.

3. The helmet-type hands free system according to claim 1, wherein the hands free module is assigned a unique ID to identify the other party upon performing the radio communication function.

4. The helmet-type hands free system according to claim 1, wherein the mobile communication terminal and the first Bluetooth module are incorporated into a single entity.

5. The helmet-type hands free system according to claim 1, wherein the hands free function key input unit and the first ZigBee module are incorporated into a single entity.

* * * * *